United States Patent [19]
Stephenson

[11] Patent Number: 6,112,031
[45] Date of Patent: *Aug. 29, 2000

[54] GENERATING DIGITIZED IMAGES ON SILVER HALIDE

[75] Inventor: Stanley W. Stephenson, Spencerport, N.Y.

[73] Assignee: Eastman Kodak Company, Rochester, N.Y.

[*] Notice: This patent is subject to a terminal disclaimer.

[21] Appl. No.: 08/567,980

[22] Filed: Dec. 6, 1995

Related U.S. Application Data

[60] Provisional application No. 60/002,086, Jul. 27, 1995.

[51] Int. Cl.[7] .............................. G03B 33/00; H04H 1/46
[52] U.S. Cl. ......................... 396/308; 396/305; 355/32; 358/505; 358/515
[58] Field of Search ....................................... 396/305, 307, 396/308; 352/66, 67; 358/501, 505, 515, 520; 386/44, 43

[56] References Cited

U.S. PATENT DOCUMENTS

| | | | |
|---|---|---|---|
| 3,475,549 | 10/1969 | Goldmark et al. | 386/43 |
| 3,586,434 | 6/1971 | Mueller | 355/2 |
| 3,591,709 | 7/1971 | Takagi et al. | 386/30 |
| 3,609,010 | 9/1971 | Mueller | 359/559 |
| 3,637,925 | 1/1972 | Flory et al. | 386/30 |
| 3,641,895 | 2/1972 | Bestenreiner et al. | 396/307 |
| 3,647,945 | 3/1972 | Hannan | 386/30 |
| 3,663,221 | 5/1972 | Higgins et al. | 430/7 |
| 3,715,461 | 2/1973 | Hanlon | 386/30 |
| 3,759,155 | 9/1973 | Bestenreiner et al. | 396/307 |
| 3,820,992 | 6/1974 | Bestenreiner et al. | . |
| 3,882,536 | 5/1975 | Hanlon | 348/290 |
| 3,903,531 | 9/1975 | Yevick | 396/307 |
| 4,008,482 | 2/1977 | Lang | 396/309 |
| 4,261,007 | 4/1981 | Frohbach et al. | 386/30 |
| 4,584,615 | 4/1986 | Fisch | 386/42 |
| 4,689,696 | 8/1987 | Plummer | 386/43 |
| 4,926,250 | 5/1990 | Konishi | 358/501 |
| 5,155,589 | 10/1992 | Gere | 348/29 |
| 5,294,993 | 3/1994 | Sable | 347/232 |
| 5,335,082 | 8/1994 | Sable | 347/232 |
| 5,606,379 | 2/1997 | Williams | 396/308 |

OTHER PUBLICATIONS

Edward Yost and Sondra Wenderoth, "Additive Color Aerial Photography", 1968, Manual of Color Aerial Photography, First Edition, American Society of Photogrammetry, pp. 451–471.

E. J. Wall, F.C.S., F.R.P.S., "Screen Plates–Historical and Theoretical Data", 1970, The History of Three–Color Photography, Chapter XVII, pp. 454–473, The Focal Press.

E. J. Wall, F.C.S., F.R.P.S., "Still Cameras and Chromoscopes", 1970, The History of Three–Color Photography, pp. 130–131, The Focal Press.

E. J. Wall, F.C.S., F.R.P.S., "Optical Data", 1970, The History of Three–Color Photography, 191–193, The Focal Press.

"Additive Color Photography", 1993, The Focal Encyclopedia of Photography, pp. 139–140, The Focal Press.

(List continued on next page.)

*Primary Examiner*—Alan A. Mathews
*Attorney, Agent, or Firm*—Robert Luke Walker

[57] ABSTRACT

A system for recording and reproducing a color image of a scene includes an image recording apparatus including a body portion for containing components of the apparatus and for housing a roll of black and white silver halide emulsion film. The body portion includes a focal lens for focusing scene illumination to expose the film with the scene image. A color filter disposed in the body portion filters the scene illumination. The filter includes a color filter array having a plurality of adjacent pixel arrays, whereby the scene illumination is pixelated on the black and white film for each array as units of luminance and chrominance information. The system also includes an image reproduction apparatus including a scanner for optically scanning the film pixels, a decoder for decoding the pixelated monochrome image into a color image, and a processor for processing high resolution luminance and low resolution chrominance pixels to a plurality of pixels, each having trichrominance values using data from adjacent pixels

26 Claims, 3 Drawing Sheets

OTHER PUBLICATIONS

William S. Davis, "Color Photography", 1939, Practical Amateur Photography, Chapter XVI, pp. 224–227, Garden City Publishing Co., Inc.

"Separation Filters", 1992, The Photonics Dictionary, Book 4 p. D–121, Laurin Publishing Company.

"Recording Electronic Images on Film", 1989, Imaging Processes and Materials, Neblette's Eight Edition, pp. 411–414, Van Nostrand Reinhold.

GENERATING DIGITIZED IMAGES ON SILVER HALIDE

CROSS REFERENCE TO RELATED APPLICATION

Reference is made to and priority claimed from U.S. Provisional Application Ser. No. 60/002,086, filed Jul. 27, 1995, entitled GENERATING DIGITIZED IMAGES ON SILVER HALIDE.

FIELD OF THE INVENTION

This invention relates to recording color images on black and white silver halide emulsion film and more particularly to a method and apparatus using a high resolution color filter array for recording high resolution luminance and low resolution chrominance information on the black and white film and subsequently recreating color images using the recorded information.

BACKGROUND OF THE INVENTION

Conventional color photographic systems use an optical system to project a focused image onto a film having multiple light-sensitive layers. These multilayer color films have several disadvantages when compared to black and white (B/W) film emulsions. Processing of silver halide (AgX) in color film is a slow process because development chemistries must diffuse through a thicker depth of emulsion than found in black and white film emulsion. Lower layers of film emulsion lose speed because of light loss due to silver halide particles in the upper layers. Also, light traveling through the thick, multilayer film loses sharpness through light scatter. These multilayer color films store the image as formed dyes which are not as permanent as the silver metal in black and white film images. Finally, the complexity and therefore the cost of color multilayer films is greater. It would be advantageous to use a black and white film emulsion to make color images.

Recent advances in optical microstructures have allowed the creation of high resolution (10 micron) color filter arrays (CFA). The resolution of these CFA's is high enough to match the resolution required for simple consumer imaging. These arrays are used on CCD imagers to filter the panchromatic (sensitive to all visible wavelengths) to separable colors. Multiple structures have been proposed for these CFA's. It is preferable that the CFA filter out ("throw away") only a small fraction of the light passing through the filter to transfer therethrough the greatest light signal possible. It is also advantageous to store high resolution luminance (panchromatic) data and lower resolution color data for the image. In both color television and Photo CD systems, efficient use of image structures is achieved by recording high resolution panchromatic (composite red-green-blue {RGB}) signals and two lower resolution color recordings.

The Polachrome Instant Slides process prints a CFA treated light signal onto a black and white reversal film emulsion. Therein, the CFA consists of a series of red, green, and blue stripes on the film. An image is exposed on the film through the filter and developed into a slide. The earliest use of a color image silver halide emulsion system was by Joly (@ Dublin University, late 1800's).

Joly used a separate glass plate as the filter carrier. Later, the CFA and emulsion were united in the Paget process which was in use until the 1950's. The Paget process is unique in that a matrix of red, green, and blue pixels is used as the OFA on the film. All these systems have to provide optical-only displayable images. These systems suffer speed loss because each filter absorbs ⅔ of neutral (RGB) light. The present invention assumes that the film will be scanned, eliminating the need for optical projection, and allowing improved CFA structure.

SUMMARY OF THE INVENTION

The present invention provides a method and apparatus for recording and reproducing a color image using panchromatic black and white silver halide emulsion film.

Accordingly, a filter including a color filter array is disposed near panchromatic black and white film in a camera or other image recording apparatus. In the color filter array, a plurality of the pixels are clear, transmitting luminance information to the film. A sparse array of colored pixels subencodes color information onto the film for two separate colors at low resolution. Fiducial marks outside the image area of the film are illuminated using flash contacts at the time of image capture. The fiducial marks are used to identify the CFA location. Image reconstruction is done by scanning the film, determining CFA location by the fiducial marks, and creating a full color image using high resolution luminance and low resolution chrominance information.

Optionally, the color filter array takes the form of a 2×2 repeating array, wherein two diagonally disposed pixels are clear, and the remaining two pixels are fabricated of yellow and cyan dyes. Cyan marks outside the image areas are illuminated at exposure to provide CFA registration with the film. Luminance and chrominance information encoded on the film is subsequently matrixed to create a trichrominance image.

These and other features and advantages of the invention will be more fully understood from the following detailed description of the invention taken together with the accompanying drawings.

DETAILED DESCRIPTION OF THE INVENTION

Figure 1:
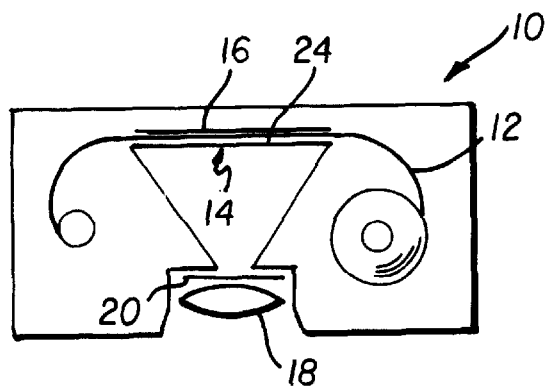
FIG. 1 is a schematic view of an image recording apparatus for recording a color scene image on black and white silver halide emulsion film constructed in accordance with the present invention.

Referring now to the drawings in detail, numeral 10 generally indicates an image recording apparatus, such as a camera. The camera 10, illustrated in FIGS. 1 and 2, includes conventional means for photographically recording a color scene image on a black and white silver halide emulsion film 12. The film 12 is disposed to sequentially advance defined image frames through an exposing area 14. A platen 16 compliantly urges the film 12 against a frame in the exposing area 14. Images are captured to an image frame 17, best seen in FIG. 3, on the film 12 using a lens 18 and shutter 20 of conventional design. The lens 18 can be composed of one or more optical elements that focus an image onto the exposing area 14. Operation of shutter 20 provides a pulse of light onto the film 12.

A color filter 22 including a color filter array 24 is disposed in near-adjacent (or actual contact) with the film 12 in the exposing area 14. The color filter array 24 includes a plurality of clear 26 and color 28 pixels formed as a matrix 30.

Preferably the color pixels 28 are disposed on the side of the filter 22 facing the film 12. In addition, the lens 18 system is adjusted to include the optical effects that occur as the image passes through the transparent support of the filter and onto the film 12. The filter 22 may contain curvature that works in conjunction with the lens 18 to optimize image quality.

The filter array 24 includes a plurality of clear pixels 26 for transmitting luminance information to the film 12. A plurality of color pixels 28 subencodes color, chrominance, information for that color(s) at low resolution on the film 12. The luminance and chrominance information recorded on the film 12 provides the luminance and color component which can be electronically processed to provide a color reproduction of the image. Although the filter 22 may include color pixels 28 of a single color, two different colors are required to cover the color sensitivity of the human eye. The recorded luminance and chrominance information is matrixed to create a trichrominance image. In effect, the black and white emulsion film 12 becomes the storage medium for high resolution luminance and low resolution color information representative of the color scene image. The frames of images on the film are sequentially exposed, removed from the camera 10 and chemically developed to create a stable, pixelated image.

One difficulty with a separable color filter array 24 is locating the color pixels 28 within the image after exposure. Referring again to FIGS. 2 and 3, this difficulty is now solved by providing indices outside the image area of the film 12 by illuminating fiducial marks 34 at the time of exposure. In the herein described invention, red light emitting diodes (LED's) 36 print the fiducial marks 34 onto the film 12 at the instant of exposure. The advantage of this technique is that these marks 34 can be used after development to indicate pixel 26,28 locations. The construction of the filter 22 can be simplified by using the filter dyes to form fiducial marks. In one embodiment, the cyan dye absorbs the light from a red LED, and is used to form the fiducial marks. Thus, the CFA needs to be printed with only two dyes to generate the CFA and fiducial marks.

The LED's 36 may be connected to a flash trigger assembly 38 on a standard camera and use the flash battery in the camera to power the diodes 36. In such a camera, the flash switch is closed at maximum aperture for about 100 microseconds. Experiments have shown that this time period is long enough for a standard 3 volt battery system to fully expose the fiducial marks 34. The fiducial marks 34 thereby locate the color array regardless of the image location on the film 12, temperature of the image capture components at exposure or emulsion shifts due to development. These marks also eliminate the need to locate the CFA pattern in an image.

Figure 2:
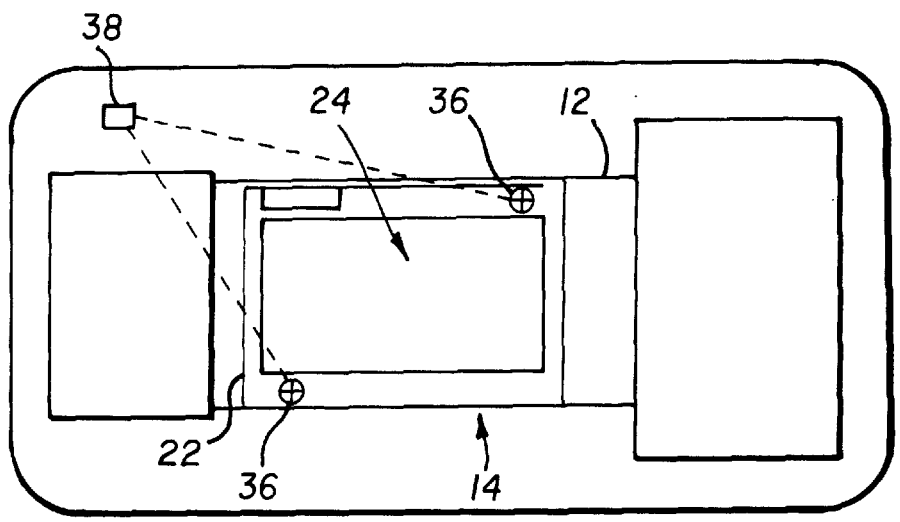
FIG. 2 is a schematic sectional view of the image recording apparatus of FIG. 1 illustrating the image area on the film and light emitting diodes for imaging fiducial marks on the film.
Figure 3:
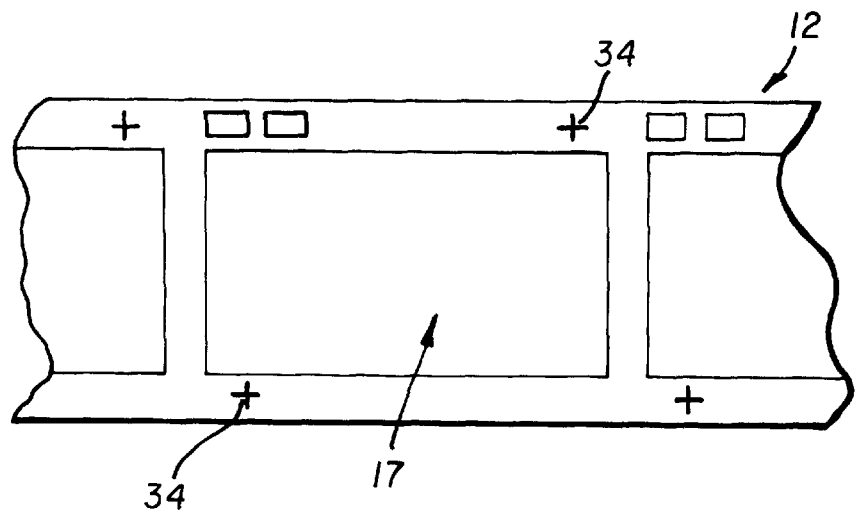
FIG. 3 is an enlarged sectional view of the film illustrating pixels on the film in the image area and fiducial marks outside the image area.
Figure 4:
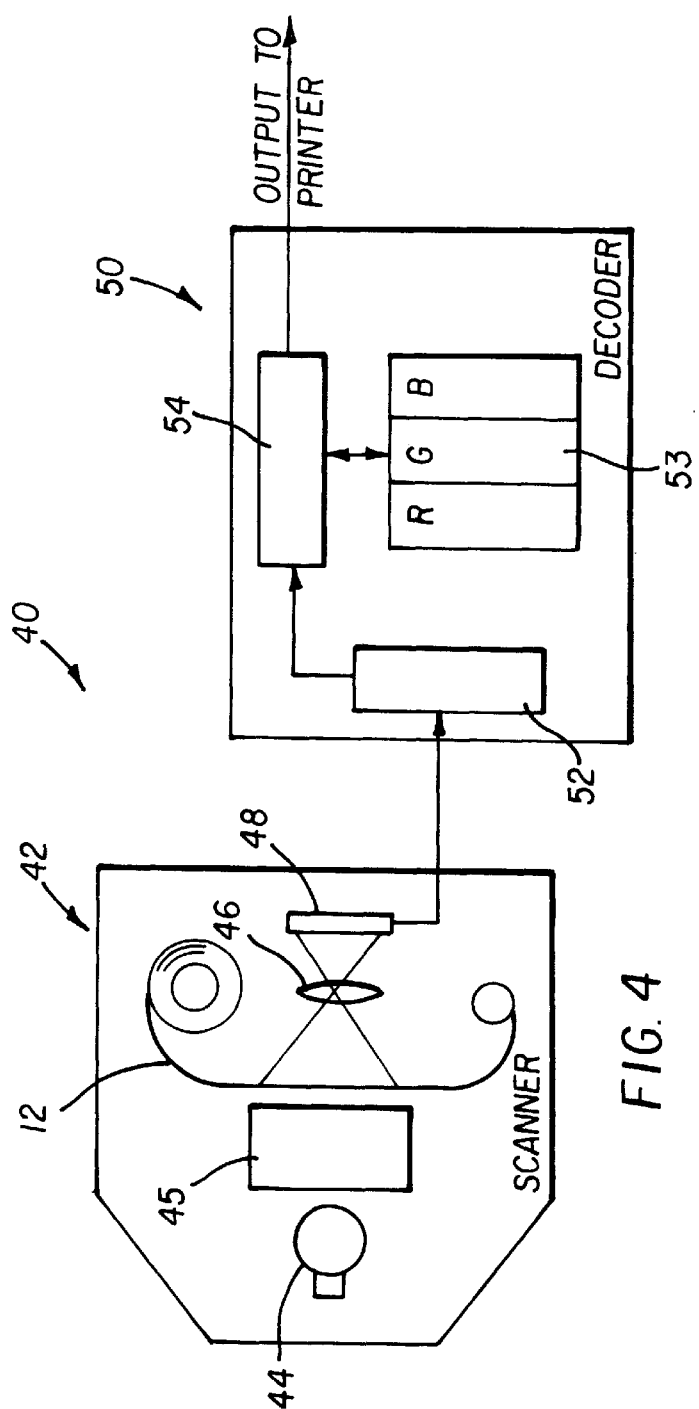
FIG. 4 is a schematic view of an image reproduction apparatus for reproducing a color image of a scene pixelated by a color filter.

In the image reproduction apparatus 40 of FIG. 4, the developed, pixelated, black and white film 12 is loaded into a scanner 42 illustrated in FIG. 2, that scans the pixelated image. A light source 44 and integration bar 45 are integrated into the scanner 42 to provide uniform illumination of a given image frame on the pixelated film 12. Focusing optics 46 take the image and project it onto a CCD (charge-coupled device) 48 of conventional design. Because the film is monochrome, the CCD 48 does not need color-sensing elements. The CCD 48 imaging element can also consist of a linear array that captures the full image in a linear sequential manner, using well-known conventional means.

The image data is then transferred to a decoder 50 that decodes the monochrome image 52 into a color image 53. The image data or a part of the image data is first stored as monochrome image 52. A processor 54 processes the scanned data to generate separate 3-color records for each monochrome element from the film.

The decoder 50 is an integral part of the reproduction apparatus 40, converting the high resolution luminance and low resolution chrominance values encoded on the film 12 to trichrominance values using data from adjacent pixels 26,28 as herein described. The color image may then be reproduced electronically by communicating the trichrominance values to a display device or printer, not shown. The printer can use light-to-silver halide surfaces, electrophotographic, thermal or ink-jet printing technologies. The display device and/or printer may be incorporated in the reproduction apparatus 40.

Figure 5:
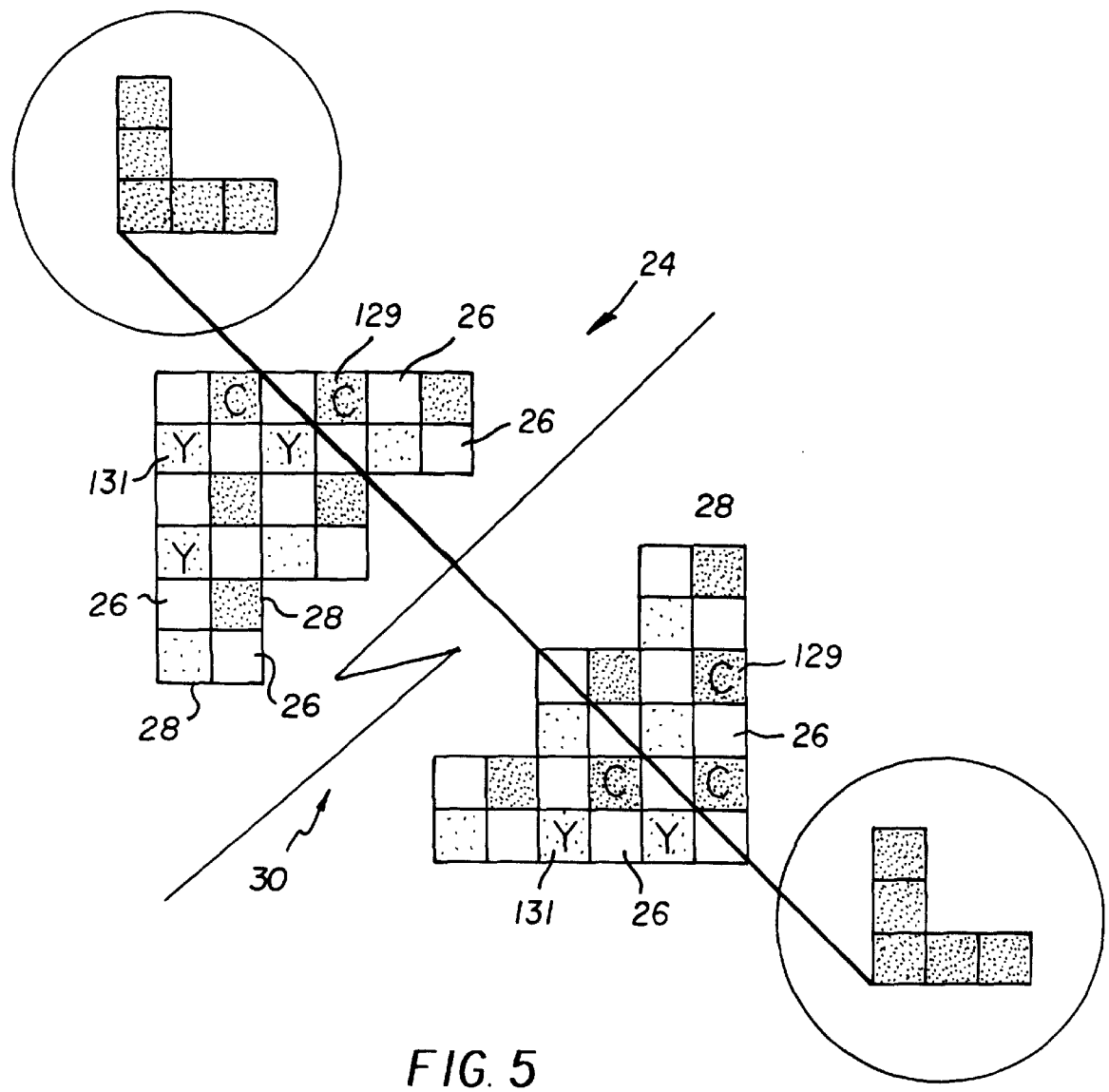
FIG. 5 is an illustrative view of a color filter array constructed in accordance with the present invention.

An optional color filter array 124 shown in FIG. 5 consists of repeating sets of 2×2 pixel arrays. In each pixel array, two diagonally opposed pixels are clear 26, allowing unfiltered passage of light to provide luminance information on the film. The other pixels 28 are used to record low-resolution (1 pixel/4 pixel) color information. Because the human eye is most sensitive to green light, one pixel 129 stores minus red (cyan) and one pixel 131 stores minus blue (yellow filter), while green light is passed to all pixels. If neutral, red, green, and blue light is incident on all four pixels and only 2 of the 12 units of light are lost, with only a 16% loss in system speed as contrasted with the loss of ⅔ of the RGB light of other processes. This color filter array 124 can be mounted in close proximity to a black and white film emulsion to pixelate an image as two units of luminance (RGB) and one each of two chrominance (minus-red and minus-blue) pixels. The color filter array 124 has a thickness and an optical surface on the camera lens side that works with the camera's primary optic to provide a focused image on the film emulsion. Such an array 124 is efficient and can be digitally reconstructed to create a full color image as herein more fully described.

In an experiment conducted to study system configuration, a thermal laser process was used to create a 480×640 pixel array in a 24 mm×36 mm area. A laser transferred cyan (minus red) and yellow (minus blue) dyes in a staggered pattern, leaving two clear areas for each pair of color patches. The array was mounted into a simple 35 mm camera, the Kodak STAR 375. The CFA was spaced about 25 microns from the surface of a black and white film emulsion. Two red LED's were triggered by the flash synchronization switch to illuminate small areas of the image area. The resulting captured images had reasonably well focused color pixels imaged on the film.

Reconstructing the image is done by scanning the film. Preferably, the film is scanned at a higher resolution than the CFA. In the test case, the CFA was 480×720 pixels at a 50 micron pitch. The image was scanned at 2,048×3,046 pixels, providing about 4 scan pixels per CFA pixel. The fiducial area had sharply imaged pixels that corresponded to the cyan pixels. The sharpness was good enough to accurately determine CFA location on the film.

Figure 6:
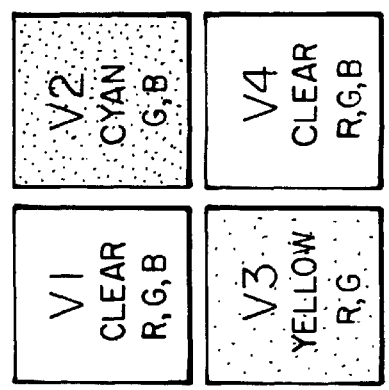
FIG. 6 is a schematic view of a repeating array in the CFA of FIG. 5.

One method of reconstruction of a full RGB record for each pixel uses the method illustrated in FIG. 6. An array of four pixels is shown, with each pixel number labeled as to dye content. The following equations are used to create the red, green, and blue values for each of the four pixels.

Pixel 1
   Red=V1−V2
   Green=V2+V3−V1
   Blue=V1−V3
Pixel 2
   Red =V1−V2
   Green=V2+V1−V3
   Blue=V1−V3
Pixel 3
   Red=V4−V2
   Green=V2+V3−V1
   Blue=V4−V3
Pixel 4
   Red=V4−V2
   Green=V2+V4−V3
   Blue=V4−V3

The RGB value for each pixel is found by using the four values (V1, V2, V3, V4) found in each area of the CFA. In the case of pixel 1, the red value is found by using its V1 and subtracting the density reading of a nearby pixel covered by a cyan dye patch (V2). Green is found by adding together density from cyan and yellow pixels (V2+V3) and subtracting the pixel one reading (V1).

Several observations can be made about the efficiency of this algorithm. The human eye sees grays at high resolution and color at low resolution. The human eye is also most sensitive to green information. The color filter array works well with these factors. The CFA and algorithm uses ⅓ local content for every green record reconstructed. The clear pixels always use the native value for all three colors and the filtered pixels use the native value on two of the three color records. The result of using this algorithm is that 4 data values regenerate 12 (4 pixels of R,G,B) data values.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

Parts List 10. camera
12. film
14. exposing area
16. platen
17. image frame
18. lens
20. shutter
22. filter
24. filter array
26. clear pixel
28. color pixel
30. matrix
34. fiducial marks
36. LEDts
38. flash trigger assembly
40. image reproduction apparatus
42. scanner
44. light source
45. integration bar
46. focusing optics
48. CCD (charge coupled device)
50. decoder
52. monochrome image
53. color image
54. processor
124. filter array
126. clear pixels
128. pixels
129. pixels
131. pixels

What is claimed is:

1. A method of recording a color scene image on a monochrome photographic recording medium, comprising the steps of:
   a. separating the color scene image into luminance and chrominance components; and
   b. recording the components on the recording medium as an optical image, the luminance component being recorded on a larger total area than any one of the chrominance components.

2. The method of claim 1 wherein the combined recording areas fall within a standard image format.

3. The method of claim 1 further comprising the step of recording fiducial marks to indicate the location of the respective components on the recording medium.

4. The method of claim 1 wherein the luminance component is panchromatic.

5. The method of claim 4 wherein the chrominance components are minus red and minus blue.

6. The method of claim 1 wherein the step of separating the color image into components is performed optically.

7. The method of claim 1 wherein the step of separating the color image into components is performed optically and the components are panchromatic, minus red, and minus blue, the panchromatic component being the luminance component.

8. The method of claim 1 further comprising scanning the recording medium following said recording and decoding the luminance and chrominance components into a color image.

9. The method of claim 1 further comprising focusing said scene image at said recording medium, said separating being successive to said focusing.

10. The method of claim 1 wherein said separating further comprises pixellating said scene image.

11. A method of recording a color scene image on a monochrome photographic recording medium, comprising the steps of
   a. separating the color image into luminance and chrominance components; and
   b. recording the components on the recording medium as an optical image, such that the luminance component is recorded with a higher resolution than any one of the chrominance components.

12. The method of claim 11 wherein the combined recording areas fall within a standard image format.

13. The method of claim 11 further comprising the step of recording fiducial marks to indicate the location of the respective components on the recording medium.

14. The method of claim 14 wherein the luminance component is panchromatic.

15. The method of claim 14 wherein the chrominance components are minus red and minus blue.

16. The method of claim 11 wherein the step of separating the color image into components is performed optically.

17. The method of claim 11 further comprising, following said recording, scanning the recording medium and decoding the luminance and chrominance components into a color image.

18. The method claim 11 wherein the step of separating the color image into components is performed optically and the components are panchromatic, minus red, and minus blue, the panachromatic component being the luminance component.

19. A method of recording a color scene image on a monochrome photographic recording medium, comprising the steps of:

filtering the color scene image into a luminance component and at least one chrominance component;

pixellating each component; and recording the components on the recording medium as an optical image.

20. The method of claim 19 wherein said optical image is in the form of a matrix of pixels of said components, and said method further comprises the step of recording fiducial marks on the recording medium, said fiducial marks being indicative of the locations of said pixels.

21. The method of claim 19 wherein said luminance component is panchromatic.

22. The method of claim 19 wherein said filtering is optical.

23. A method of recording a color image on a monochrome photographic recording medium, comprising the steps of:

a. separating the color image into luminance and chrominance components, said luminance component being panchromatic, said chrominance components being minus red and minus blue; and b. recording the components on the recording medium, the luminance component being recorded on a larger total area than any one of the chrominance components.

24. The method of claim 23 wherein the steps of separating the color image into components and recording the components are performed optically.

25. A method of recording a color image on a monochrome photographic recording medium, comprising the steps of a. separating the color image into luminance and chrominance components, said luminance component being panchromatic, said chrominance components being minus red and minus blue; and b. recording the components on the recording medium, such that the luminance component is recorded with a higher resolution than any one of the chrominance components.

26. The method of claim 25 wherein the steps of separating the color image into components and recording the components are performed optically.

\* \* \* \* \*